(12) United States Patent
Yoshida et al.

(10) Patent No.: US 9,847,746 B2
(45) Date of Patent: Dec. 19, 2017

(54) MOTOR CONTROL DEVICE

(71) Applicant: DENSO CORPORATION, Kariya, Aichi-pref. (JP)

(72) Inventors: Kazuhiro Yoshida, Kariya (JP); Seiji Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/237,907

(22) Filed: Aug. 16, 2016

(65) Prior Publication Data

US 2017/0077858 A1  Mar. 16, 2017

(30) Foreign Application Priority Data

Sep. 10, 2015  (JP) ................. 2015-178248

(51) Int. Cl.
| | |
|---|---|
| *H02P 25/08* | (2016.01) |
| *H02P 1/00* | (2006.01) |
| *H02P 23/20* | (2016.01) |
| *H02P 27/06* | (2006.01) |
| *F16H 61/28* | (2006.01) |

(52) U.S. Cl.
CPC ............ *H02P 23/20* (2016.02); *F16H 61/28* (2013.01); *H02P 25/08* (2013.01); *H02P 27/06* (2013.01)

(58) Field of Classification Search
CPC . B41J 19/202; B41J 29/393; B60L 2240/423; B60L 11/123; B60L 11/14; B60L 2200/26; B60L 2220/14; B60L 2240/12; B60L 2240/421; B60L 2240/441; B60L 2240/547; B60L 2240/549; B60L 11/1803

USPC .............. 318/254.1, 432, 466, 139, 400.3
See application file for complete search history.

(56) References Cited

U.S. PATENT DOCUMENTS

| | | | | | |
|---|---|---|---|---|---|
| 4,475,631 | A | * | 10/1984 | Nomura ..................... | B66B 1/30 187/296 |
| 4,553,640 | A | * | 11/1985 | Inaba ....................... | B66B 1/285 187/292 |
| 4,558,265 | A | * | 12/1985 | Hayashida ........... | G05B 19/416 318/561 |
| 4,641,073 | A | * | 2/1987 | Sawada ..................... | H02P 8/04 318/685 |
| 4,691,154 | A | * | 9/1987 | Sato ......................... | H02P 8/32 318/567 |

(Continued)

*Primary Examiner* — Paul Ip
(74) *Attorney, Agent, or Firm* — Nixon & Vanderhye P.C.

(57) ABSTRACT

A motor control device is provided with a control circuit and a driving circuit. The control circuit switches over a current supply phase of the motor in a predetermined angular rotation of the rotor a first switching number of times in an acceleration range. The control circuit switches over the current supply phase of the motor in the predetermined angular rotation of the rotor a second switching number of times in a stationary rotation range in a specific condition that the rotation speed of the rotor is between a predetermined first threshold value and a predetermined second threshold value. The control circuit sets the second switching number to be smaller than the first switching number. In the acceleration range, the switching number is relatively large and hence a sufficient driving torque is applied to the rotor. In the stationary rotation range, the switching number is relatively small and hence the control circuit 61 needs to operate less, a current supply period for the motor is shortened and heat generation is suppressed.

20 Claims, 8 Drawing Sheets

(56) References Cited

U.S. PATENT DOCUMENTS

| | | | | |
|---|---|---|---|---|
| 4,866,357 A * | 9/1989 | Miller | B60S 1/08 | 318/443 |
| 4,959,598 A * | 9/1990 | Yoshida | G05D 17/02 | 318/466 |
| 5,831,403 A * | 11/1998 | Kanki | G05B 19/232 | 318/274 |
| 6,006,848 A * | 12/1999 | Boehringer | B60K 31/047 | 180/178 |
| 6,008,609 A * | 12/1999 | Sawashima | G05B 19/186 | 318/569 |
| 6,139,205 A * | 10/2000 | Suzuki | B41J 19/202 | 400/279 |
| 6,483,270 B1 * | 11/2002 | Miyazaki | G05B 19/231 | 318/609 |
| 6,877,837 B1 * | 4/2005 | Igarashi | B41J 19/202 | 318/616 |
| 6,901,325 B2 * | 5/2005 | Kustosch | B60K 31/047 | 701/93 |
| 7,075,259 B2 * | 7/2006 | Nakai | F16H 61/32 | 318/432 |
| 7,147,299 B2 * | 12/2006 | Igarashi | B41J 19/202 | 318/616 |
| 7,312,595 B2 * | 12/2007 | Kamio | G05B 19/4062 | 318/564 |
| 7,628,465 B2 * | 12/2009 | Aruga | B41J 29/393 | 347/12 |
| 7,667,427 B2 * | 2/2010 | Kamio | G05B 19/4062 | 318/568.24 |
| 8,134,324 B2 * | 3/2012 | Nishida | B25J 9/1623 | 318/567 |
| 8,414,101 B2 * | 4/2013 | Anzai | B41J 19/202 | 347/19 |
| 8,456,121 B2 * | 6/2013 | Yuasa | B60N 2/0232 | 318/266 |
| 8,456,124 B2 * | 6/2013 | Nishida | B25J 9/1623 | 318/163 |
| 2003/0121263 A1 * | 7/2003 | Hidaka | F02B 37/24 | 60/602 |
| 2003/0222617 A1 | 12/2003 | Nakai et al. | | |
| 2004/0008002 A1 * | 1/2004 | Kamio | G05B 19/4062 | 318/701 |
| 2004/0040758 A1 * | 3/2004 | Shimizu | B60K 6/44 | 180/65.225 |
| 2004/0049333 A1 * | 3/2004 | Kustosch | B60K 31/047 | 701/93 |
| 2005/0146555 A1 * | 7/2005 | Igarashi | B41J 19/202 | 347/37 |
| 2005/0151492 A1 * | 7/2005 | Nakai | F16H 61/32 | 318/432 |
| 2006/0033464 A1 | 2/2006 | Nakai et al. | | |
| 2006/0108966 A1 * | 5/2006 | Kamio | G05B 19/4062 | 318/701 |
| 2006/0197489 A1 | 9/2006 | Nakai et al. | | |
| 2007/0182353 A1 | 8/2007 | Kamio et al. | | |
| 2008/0024081 A1 | 1/2008 | Isobe et al. | | |
| 2009/0112386 A1 * | 4/2009 | Saitoh | B60L 11/1887 | 701/22 |
| 2009/0118949 A1 * | 5/2009 | Heap | B60W 10/06 | 701/55 |
| 2009/0193923 A1 | 8/2009 | Nakai et al. | | |
| 2010/0201294 A1 * | 8/2010 | Yuuki | B60L 15/025 | 318/400.3 |
| 2010/0256847 A1 * | 10/2010 | Kimbara | B60L 3/104 | 701/22 |
| 2011/0043157 A1 * | 2/2011 | Yuasa | B60N 2/0232 | 318/599 |
| 2011/0043158 A1 * | 2/2011 | Yuasa | B60N 2/0232 | 318/599 |
| 2011/0068730 A1 | 3/2011 | Nakai et al. | | |
| 2011/0092334 A1 * | 4/2011 | Baino | B60K 6/387 | 477/5 |
| 2011/0316467 A1 * | 12/2011 | Nishida | B25J 9/1623 | 318/611 |
| 2012/0026217 A1 * | 2/2012 | Anzai | B41J 19/202 | 347/5 |
| 2013/0278196 A1 * | 10/2013 | Tian | G05B 13/0265 | 318/430 |
| 2014/0139170 A1 * | 5/2014 | Tian | G05B 13/0265 | 318/561 |
| 2014/0236411 A1 * | 8/2014 | Amano | B60L 11/123 | 701/22 |
| 2014/0244092 A1 * | 8/2014 | Amano | B60L 11/123 | 701/22 |

* cited by examiner

NORMAL CURRENT SUPPLY MAP

| PATTERN | A1 | A2 | A3 | A4 | A5 | A6 |
|---|---|---|---|---|---|---|
| U-PHASE | ○ | ○ |  |  |  | ○ |
| V-PHASE |  |  |  | ○ | ○ | ○ |
| W-PHASE |  | ○ | ○ | ○ |  |  |

FIG. 7

LOW-SWITCHING CURRENT SUPPLY MAP

| PATTERN | B1 | B2 | B3 | B4 | B5 | B6 |
|---|---|---|---|---|---|---|
| U-PHASE |  | ○ |  |  |  | ○ |
| V-PHASE |  |  |  | ○ |  | ○ |
| W-PHASE |  | ○ |  | ○ |  |  |

LOW-SWITCHING CURRENT SUPPLY MAP

| PATTERN | C1 | C2 | C3 | C4 | C5 | C6 |
|---|---|---|---|---|---|---|
| U-PHASE | ○ | | | | | |
| V-PHASE | | | | | ○ | |
| W-PHASE | | | ○ | | | |

FIG. 10

LOW-SWITCHING CURRENT SUPPLY MAP

| PATTERN | D1 | D2 | D3 | D4 | D5 | D6 |
|---|---|---|---|---|---|---|
| U-PHASE | ○ | ○ | | | | ○ |
| V-PHASE | | | | | | |
| W-PHASE | | | | | | |

FIG. 11

LOW-SWITCHING CURRENT SUPPLY MAP

| PATTERN | E1 | E2 | E3 | E4 | E5 | E6 |
|---|---|---|---|---|---|---|
| U-PHASE | | | | | | |
| V-PHASE | | | | | | |
| W-PHASE | | | | | | |

FIG. 12

//<br>
MOTOR CONTROL DEVICE

CROSS REFERENCE TO RELATED APPLICATION

This application is based on Japanese patent application No. 2015-178248 filed on Sep. 10, 2015, the whole contents of which are incorporated herein by reference.

FIELD

The present disclosure relates to a motor control device.

BACKGROUND

A conventional motor control device rotationally drives a rotor of a motor to a target rotation position by switching over current supply phases of the motor based on output signals of an encoder. JP 2008-32176 A (US 2008/0024081 A1) discloses a motor control device, which rotationally drives a motor of a shift-by-wire system of an automatic transmission of a vehicle. This motor control device limits power supply to the motor when a heat generation state is detected, so that the shift-by-wire system is protected from failure, which is caused by heat generation of the motor control device. The heat generation is caused when the current supply phases are switched over.

In the motor control device described above, convenience is low because power supply to the motor is lowered when the heat generation state is determined. That is, in the heat generation state, the motor does not rotate and the motor is not controlled to rotate even when a driver manipulates a shift lever of the automatic transmission.

SUMMARY

It is an object of the present disclosure to provide a motor control device, which suppresses heat generation without lowering convenience.

According to one aspect, a motor control device is provided for an operation system, which is provided with a motor, an encoder for outputting a pulse signal in synchronization with a rotation of a rotor of the motor. The motor control device comprises a control circuit for determining a current supply phase of the motor based on the pulse signal outputted from the encoder, and a driving circuit for rotationally driving the rotor to a target rotation position by switching over the current supply phase in response to a command of the control circuit. The control circuit is configured to switch over a current supply phase of the motor in a predetermined angular rotation of the rotor a first switching number of times in an acceleration range, which is from a start of rotational driving of the rotor to attainment of a rotation speed of the rotor to a predetermined first threshold value, and in a deceleration range, which is from a start of decreasing the rotation speed of the rotor toward a stop at a target rotation position to the stop of the rotor at the target rotation position. The control circuit is configured to switch over the current supply phase of the motor in the predetermined angular rotation of the rotor a second switching number of times in a stationary rotation range between the acceleration range and the deceleration range and in a specific condition that the rotation speed of the rotor is between the first threshold value and a predetermined second threshold value. The control circuit is configured to set the second switching number to be smaller than the first switching number.

EMBODIMENT

A motor control device will be described below with reference to plural embodiments shown in the drawings. Same structural parts are designated with same reference numerals among plural embodiments to simplify detailed description.

First Embodiment

Figure 1:
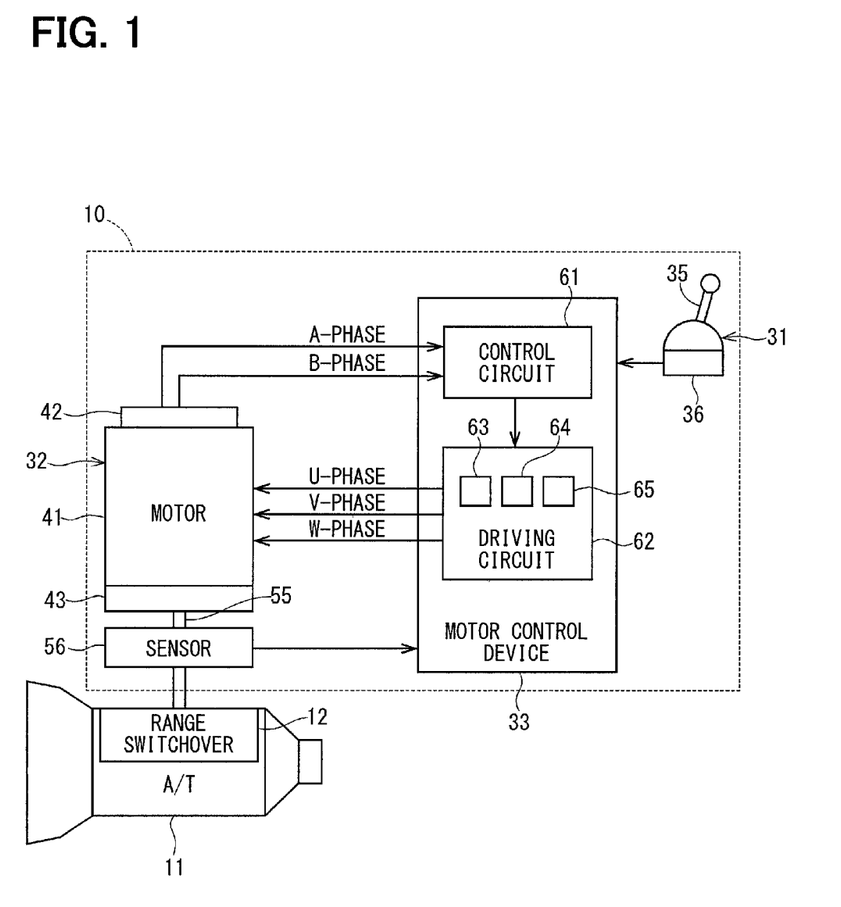
FIG. 1 is a block diagram of a shift-by-wire system of an automatic transmission, which implements a motor control device according to a first embodiment.

A motor control device according to a first embodiment is implemented in a shift-by-wire system of a vehicle. As shown in FIG. 1, a shift-by-wire system 10 is provided to operate electrically a range switchover mechanism 12 mounted in an automatic transmission (A/) 11 of a vehicle.

(Range Switchover Mechanism)

Figure 2:
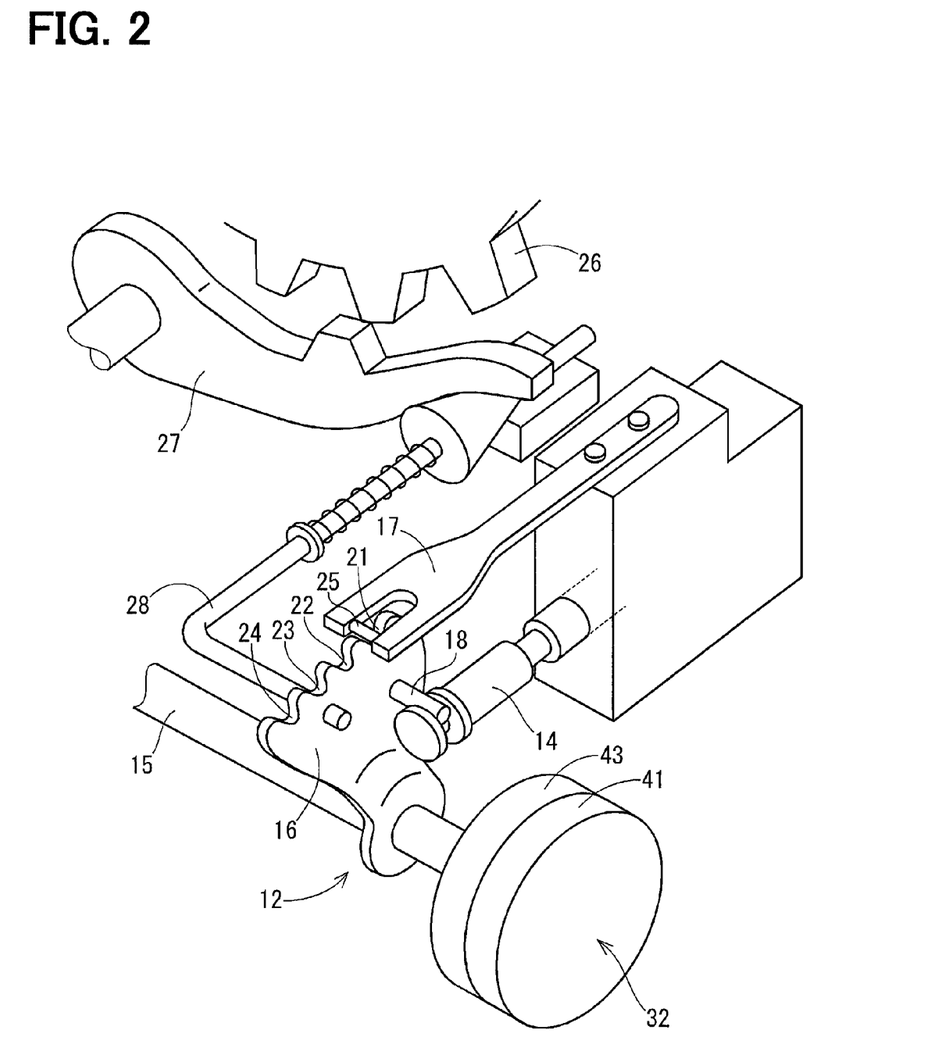
FIG. 2 is a perspective view of a range switchover mechanism provided in the automatic transmission shown in FIG. 1.

The range switchover mechanism 12 will be described first with reference to FIG. 2. The range switchover mechanism 12 is provided to switch over a shift range by changing an axial position of a manual spool valve 14, which is provided in a hydraulic pressure control circuit of the automatic transmission 11. The range switchover mechanism 12 is provided with a control rod 15, a detent plate 16 and a leaf spring 17.

The control rod 15 is coupled to a rotary actuator 32 of the shift-by-wire system 10. The detent plate 16 rotates integrally with the control rod 15. A part of a rotary motion of the detent plate 16 is transmitted to the manual spool valve 14 through a pin 18. This part of the rotary motion corresponds to a component of the rotary motion, which is in an axial direction of the manual spool valve 14. A recess part 21, a recess part 22, a recess part 23 and a recess part 24 are formed on an outer peripheral part of the detent plate 16 in the above-described order from one side of the direction of rotation.

The leaf spring 17 is fixed to a fixing member of the automatic transmission 11 at its one end. The leaf spring 17 has an engagement part 25 at its other end. The engagement part 25 is enageable with the outer peripheral part of the detent plate 16. The manual spool valve 14 is held at positions in its axial direction when the engagement part 25 fits in the recess parts 21 to 24. A parking range (P) corresponds to the position, at which the engagement part 25 fits in the recess part 21. A reverse range (R) corresponds to the position, at which the engagement part 25 fits in the recess part 22. A neutral range (N) corresponds to the position, at which the engagement part 25 fits in the recess part 23. A drive range (D) corresponds to the position, at which the engagement part 25 fits in the recess part 24.

The range switchover mechanism 12 is further provided with a parking gear 26, a parking pawl 27 and a parking rod 28. The parking gear 26 rotates integrally with an output shaft of the automatic transmission 11. The parking pawl 27 is provided to be able to approach and leave the parking gear 26. When the parking pawl 27 approaches and engages the parking gear 26, it restricts a rotation of the parking gear 26 and locks the output shaft of the automatic transmission 11. In the parking range, the parking rod 28 drives the parking pawl 27 to approach the parking gear 26. In shift ranges other than the parking range, the parking rod 28 drives the parking pawl 27 to leave the gear 26.

(Shift-by-Wire System)

Figure 3:
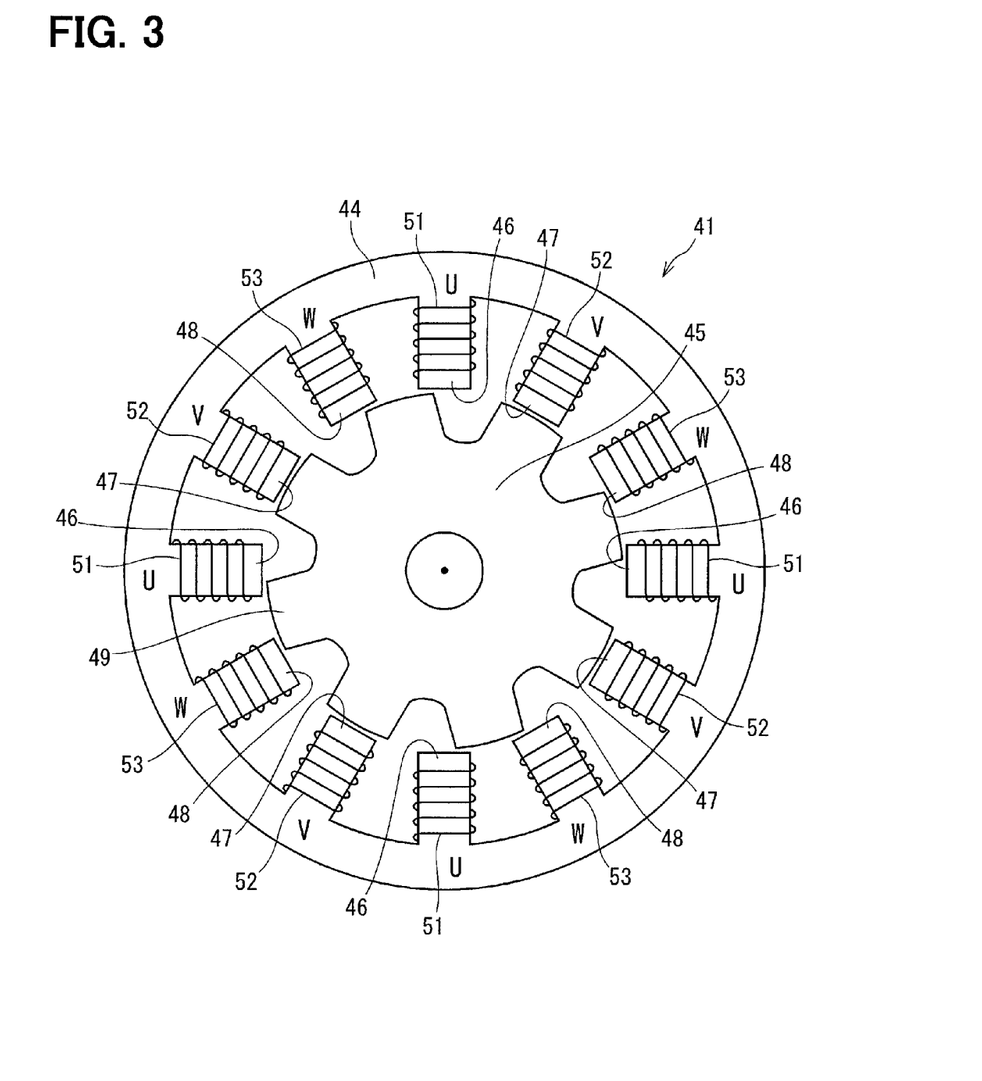
FIG. 3 is a schematic view of a motor shown in FIG. 1.

The shift-by-wire system 10 will be described next with reference to FIG. 1 and FIG. 3. As shown in FIG. 1, the shift-by-wire system 10 is provided with a shift manipulation device 31, a rotary actuator 32 and a motor control device 33. The motor control device 31 is coupled to a shift lever 35 manipulated by a driver and a shift position sensor 36, which detects a manipulation position of the shift lever 35. The shift position sensor 36 outputs a signal, which corresponds to a manipulation position of the shift lever 35, to the motor control device 33.

The rotary actuator 32 is provided with a motor 41, an encoder 42 and a reduction device 43, which outputs the rotation of the motor 41 after speed reduction. As shown in FIG. 3, the motor 41 is a switched-reluctance motor, in which a stator core 44 and a rotor 45 have salient poles, respectively. On an inner peripheral part of the stator core 44, twelve salient poles 46, 47 and 48, for example, are formed equi-angularly. On an outer peripheral part of the rotor 45, eight salient poles 49, for example, are formed equi-angularly. With the rotation of the rotor 45, the salient pole 49 sequentially faces the salient poles 46, 47 and 48 through a small gap in a radial direction of the rotor 45. Plural phase coils, which are a U-phase coil 51, a V-phase coil 52 and a W-phase coil 53, are wound about the salient poles 46, 47 and 48, respectively. With switchover of the current supply phase, the rotor 45 is magnetically attracted to a rotary magnetic field generated by switching over the current supply phase.

Referring again to FIG. 1, the encoder 42 is formed of, for example, a magnetic rotary encoder and outputs pulse signals of A-phase and B-phase in synchronization with the rotation of the rotor 45 of the motor 41. An output shaft sensor 56 is provided on an output shaft 55 of the rotary actuator 32. The output shaft sensor 56 detects a rotation angle of the output shaft 55. The output shaft sensor 56 outputs the signal, which corresponds to the rotation angle of the output shaft 55, to the motor control device 33. The rotation angle of the output shaft 55 is used to confirm the present shift range.

The motor control device 33 is provided with a control circuit 61, which includes a programmed microcomputer, and a driving circuit 62, which includes a three-phase inverter. The control circuit 61 counts a rising edge and a falling edge of each of an A-phase pulse signal and a B-phase pulse signal, which are outputted from the encoder 42. The control circuit 61 determines the power supply phase of the motor 41 based on the count value (referred to as encoder count value) and commands it to the driving circuit 62. The driving circuit 62 is provided with switching elements 63, 64 and 65, each of which switches over in correspondence to commands from the control circuit 61. The driving circuit 62 rotationally drives the rotor 45 by switching over a current supply state to either one of a one-phase current supply state, in which a current is supplied to either one of plural phase coils 51, 52 and 53, a two-phase current supply state, in which currents are supplied to either two of plural phase coils 51, 52 and 53, and no-current supply state, in which current supply is prohibited and no current is supplied to any one of plural phase coils 51, 52 and 53.

(Motor Control Device)

The motor control device 33 will be described next in more detail with reference to FIG. 1 to FIG. 7. As sown in FIG. 4, an interval from a start of rotation to an arrival at a target rotation position of the rotor 45 is divided into an acceleration range (ACCEL), stationary rotation range and a deceleration range (DECEL). The acceleration range is a zone, from time when the rotor 45 is driven to start rotation to time when the rotor 45 attains a predetermined first threshold value N1 of rotation speed N. The first threshold value N1 is set to a rotation speed, with which the rotor 45 is expected to rotate at a sufficiently high speed and continue to rotate by inertia even when driving torque is lowered. The first threshold value N1 is set to, for example, 2,000 rpm.

Figure 4:
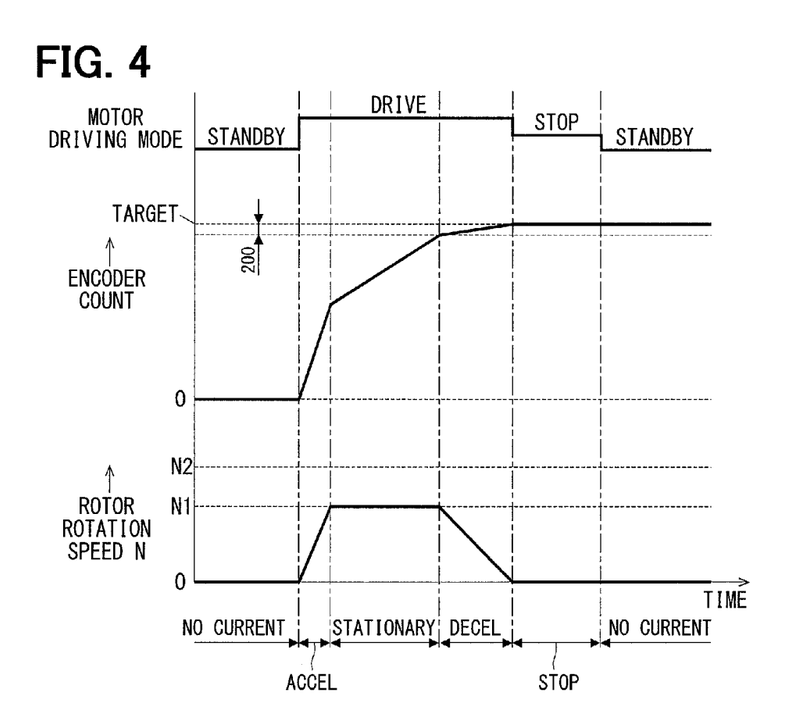
FIG. 4 is a time chart of one example of changes in a rotation speed of a rotor when the rotor of the motor shown in FIG. 1 is rotationally driven to a target rotation position.

The deceleration range is a zone, from time when the rotor 45 is driven to decelerate toward a target stop position to time when the rotor 45 stops at the target rotation position. The deceleration operation is started when a target deviation is reduced to be less than a predetermined count. The target deviation is defined as a difference between an encoder count value, which is from the start of rotation of the rotor 45 to the arrival of the rotor 45 to the target rotation position, and a present encoder count value. The predetermined count is set to, for example, 200 counts. The stationary range is a zone between the acceleration range and the deceleration range.

The control circuit 61 of the motor control device 33 determines a current supply phase of the motor 41 by selectively using two kinds of current supply maps, that is, a normal current supply map and a low-switching current supply map. Specifically, the control circuit 61 of the motor control device 33 uses the normal current supply map in the acceleration range, the deceleration range, a part of the stationary rotation area, in which the rotation speed N of the rotor 45 is lower than the first threshold value N1, and a part of the stationary rotation area, in which the rotation speed N of the rotor 45 is higher than the second threshold value N2. The control circuit 61 of the motor control device 33 uses the low-switching current supply map in a specific part of the stationary rotation range. The specific part is defined as a specific condition, in which the rotation speed N of the rotor 45 is higher than the first threshold value N1 and lower than the second threshold value N2.

Figure 5:
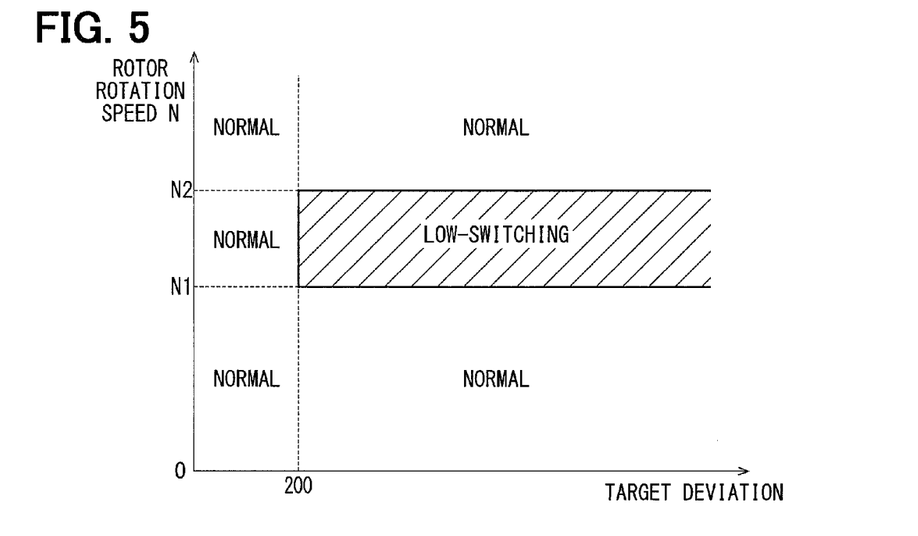
FIG. 5 is an illustration of a power supply map, which shows a relation between the rotation speed of the rotor and a target deviation and is selected by a control circuit of the motor control device shown in FIG. 1.

Specifically, as shown in FIG. 5, the normal current supply map is used when the target deviation is smaller than 200 counts for any rotation speeds of the rotor 45. The normal current supply map is also used, when the target deviation is larger than 200 counts and the rotation speed N of the rotor 45 is lower than the first threshold value N1, and when the target deviation is larger than 200 counts and the rotation speed N of the rotor 45 is larger than the second threshold value N2. The low-switching current supply map is used when the target deviation is larger than 200 counts and the rotation speed N of the rotor 45 is between the first threshold value N1 and the second threshold value N2. The second threshold value N2 is set to a rotation speed of the rotor 45, above which load of the control circuit 61 is likely to increase. The second threshold value N2 is set to, for example, 3,000 rpm.

Figure 6:
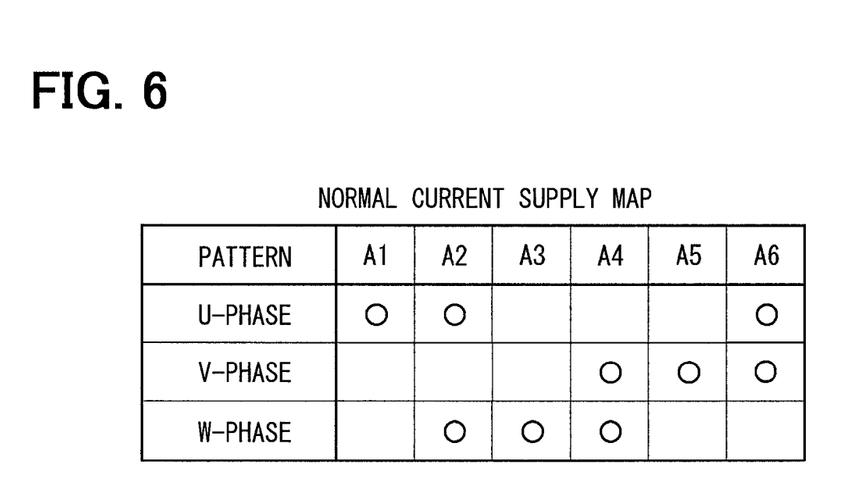
FIG. 6 is a table showing a first power supply map, which is used by the control circuit of the motor control device shown in FIG. 1.

In the normal current supply map shown in FIG. 6, the one-phase current supply and the two-phase current supply are alternated. Specifically, when the control circuit 61 uses the normal current supply map, the control circuit 61 determines the current supply phase such that the following current supply states (A1) to (A6) are switched over sequentially in a predetermined angular rotation of the rotor 45. The predetermined angular rotation corresponds to a rotation of the rotor 45 over 45° in mechanical angle and hence each of the current supply state (A1) to (A6) corresponds to one/sixth of the predetermined angular rotation, that is, 7.5° in mechanical angle.

(A1) One-phase current supply to U-phase coil 51
(A2) Two-phase current supply to U-phase coil 51 and W-phase coil 53
(A3) One-phase current supply to W-phase coil 53
(A4) Two-phase current supply to W-phase coil 53 and V-phase coil 52
(A5) One-phase current supply to V-phase coil 52
(A6) Two-phase current supply to V-phase coil 52 and U-phase coil 51

Figure 7:
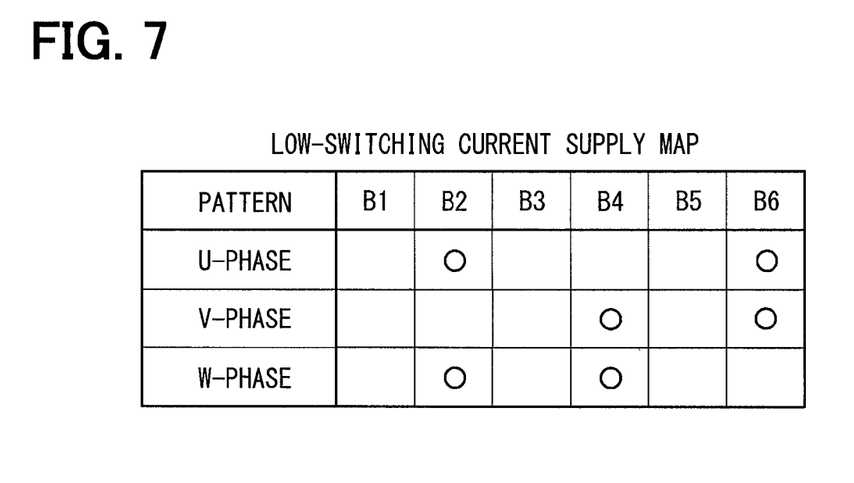
FIG. 7 is a table showing a second power supply map, which is used by the control circuit of the motor control device shown in FIG. 1.

In the low-switching current supply map shown in FIG. 7, no-current supply and the two-phase current supply are switched over alternately. Specifically, when the control circuit 61 uses the low-switching current supply map, the control circuit 61 determines the current supply phase such that the following current supply states (B1) to (B6), each of which corresponds to 7.5° in mechanical angle of rotation of the rotor 45, are switched over sequentially in the predetermined angular rotation of the rotor 45, which corresponds to 45° in mechanical angle of rotation of the rotor 45.

(B1) No-current supply
(B2) Two-phase current supply to U-phase coil 51 and W-phase coil 53
(B3) No-current supply
(B4) Two-phase current supply to W-phase coil 53 and V-phase coil 52
(B5) No-current supply
(B6) Two-phase current supply to V-phase coil 52 and U-phase coil 51

The number of switchovers of the current supply phase of the motor 41 during a predetermined angular rotation of the rotor 45 in the acceleration range is assumed to be a first switching number. The number of switchovers of the current supply phase of the motor 41 during the predetermined angular rotation of the rotor 45 under the specified condition described above is assumed to be a second switching number. As understood from comparison of FIG. 6 and FIG. 7, the control circuit 61 sets the second switching number to be less than the first switching number. In the first embodiment, the first switching number is six and the second switching number is 3. The second switching number is one half of the first switching number.

The number of switchovers of the current supply phase of the motor 41 during the predetermined angular rotation of the rotor 45 in the stationary rotation range with the rotation speed N of the rotor 45 higher than the second threshold value N2 is assumed to be a third switching number. The number of switchovers of the current supply phase of the motor 41 during the predetermined angular rotation of the rotor 45 in the stationary rotation range with the rotation speed N of the rotor 45 lower than the first threshold value N1 is assumed to be a fourth switching number. The number of switchovers of the current supply phase of the motor 41 during the predetermined angular rotation of the rotor 45 in the deceleration range is assumed to be a fifth switching number. In the first embodiment, the third switching number, the fourth switching number and the fifth switching number are set to be equal to the first switching number and smaller than the second switching number.

The number of switchovers of the current supply phase of the motor 41 indicates the number of switchovers of the operation state, which are made so that a current is supplied to at least one of the plural phase coils 51, 52 and 53. In the low-switching current supply map, the number of switchovers of the current supply phase of the motor 41 is counted up in the states (B2), (B4) and (B6).

(Processing of Control Circuit)

Figure 8:
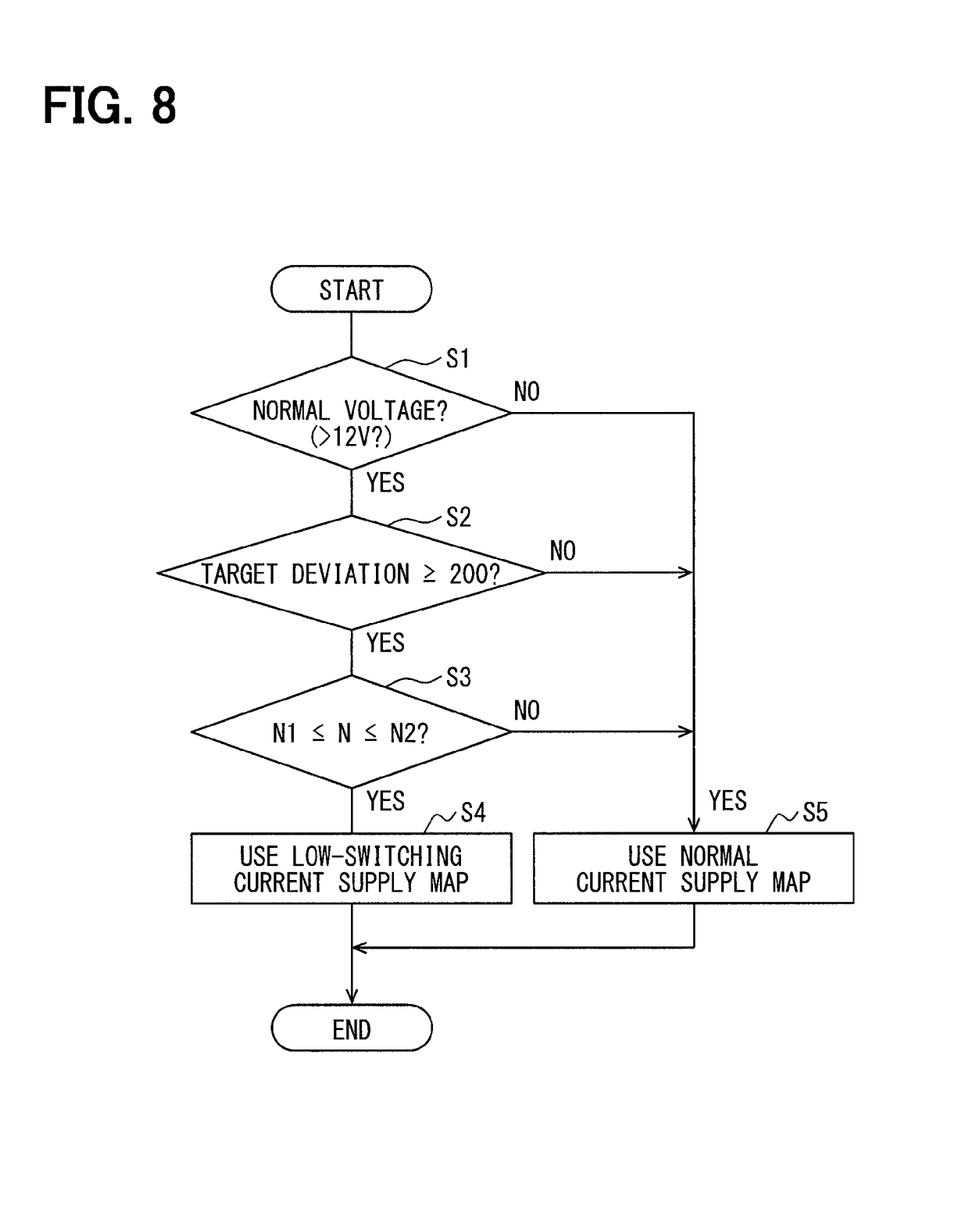
FIG. 8 is a flowchart showing processing of determining a current supply phase by the control circuit of the motor control device shown in FIG. 1.

Processing executed by the control circuit 61 for determining the current supply phase will be described with reference to FIG. 8. In FIG. 8, "S" indicates a step. The microcomputer of the control circuit 61 is programmed to execute the processing of FIG. 8. At S1 in FIG. 8, the control circuit 61 checks whether a supply voltage supplied from a battery (not shown) is normal or not. In the first embodiment, the control circuit 61 determines that the supply voltage is normal and abnormal when the supply voltage is higher and equal to or lower than 12V, respectively. When the supply voltage is normal (S1: YES), the control circuit 61 executes S2. When the supply voltage is abnormal (S1: NO), the control circuit 61 executes S5.

At S2, the control circuit 61 checks whether the target deviation is equal to or larger than 200 counts. When the target deviation is equal to or larger than 200 counts (S2: YES), the control circuit 61 determines that the motor is in the acceleration range or the stationary rotation range and executes S3. When the target deviation is smaller than 200 counts (S2: NO), the control circuit 61 determines that the motor 41 is in the deceleration range and executes S5.

At S3, the control circuit 61 checks whether the rotation speed N of the rotor 45 is equal to or higher than the first threshold value N1 and equal to or lower than the second threshold value N2, that is, between the threshold values N1 and N2. When the rotation speed N of the rotor 45 is equal to or higher than the first threshold value N1 and equal to or lower than the second threshold value N2 (S3: YES), the control circuit 61 executes S4. When the rotation speed N of the rotor 45 is lower than the first threshold value N1 or higher than the second threshold value N2 (S3: NO), the control circuit 61 executes S5.

At S4, the control circuit 61 determines the current supply phase to use the low-switching current supply map and finishes the processing. At S5, the control circuit 61 determines the current supply phase to use the normal current supply map and finishes the processing.

Advantage

As described above, the motor control device 33 includes the control circuit 61 and the driving circuit 62 in the first embodiment. The control circuit 61 sets the second switching number to be smaller than the first switching number. Further, in the first embodiment, the control circuit 61 sets the second switching number to be one half of the first switching number. As a result, when the rotor 45 is to be accelerated, the switching number is increased thereby to provide the rotor 45 with sufficient torque. On the other hand, when the rotor 45 rotates at sufficiently high rotation speed and can continue its rotation by inertia with less driving torque, the switching number is decreased thereby to decrease the number of switchovers and shorten a period of current supply to the motor 41. Thus heat generation of the control circuit 61 and the motor 41 is suppressed and power consumption is suppressed. It is therefore possible to avoid heat generation while avoiding inconvenience, which is caused conventionally by limitation of current supply to the motor at acceleration time and deceleration time.

Further, in the first embodiment, the control circuit 61 switches over the current supply state between the one-phase current supply, in which the current is supplied to any one of the plural phase coils 51, 52 and 53 of the motor 41, and the two-phase current supply, in which the current is supplied to any two of the plural phase coils 51, 52 and 53, in the acceleration range. The control circuit 61 further switches over the current supply state between the two-phase current supply and no-current supply under the specific condition described above. It is thus possible to decrease the second switching number to be smaller than the first switching number.

Still further, in the first embodiment, the control circuit 61 increases the third switching number to be larger than the second switching number. As a result, when the rotation speed N of the rotor 45 rises to exceed the second threshold value N2 and the load on the control circuit 61 tends to increase, a braking torque is applied to the rotor 45 by an increase in the switching number and the rotation speed N of the rotor 45 is decreased to be lower than the second threshold value N2. It is thus possible to suppress the load on the control circuit 61 from increasing.

Still further, in the first embodiment, the control circuit 61 increases the fourth switching number to be larger than the second switching number. As a result, when the rotation speed N of the rotor 45 falls to be lower than the first threshold value N1 and the rotor 45 becomes unable to continue rotation by inertia, a driving torque is applied to the rotor 45 by an increase in the switching number. It is thus possible to continue the rotation of the rotor 45 in the stationary rotation range.

Second Embodiment

Figure 9:
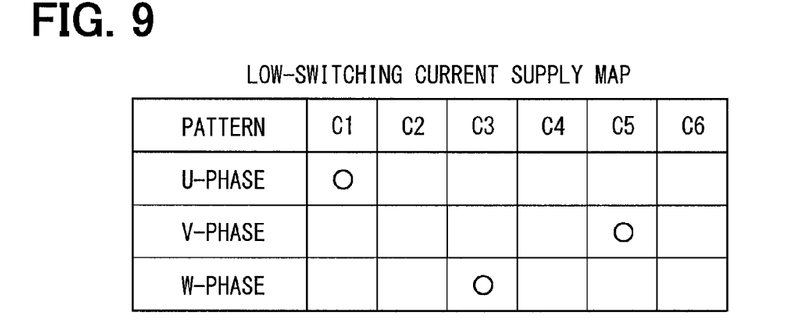
FIG. 9 is a table showing one power supply map, which is used by a motor control device according to a second embodiment.

In a second embodiment, the control circuit 61 of the motor control device 33 determines the current supply phase by using a low-switching current supply map shown in FIG. 9. In the low-switching current supply map shown in FIG. 9, the no-current supply and the one-phase current supply are switched over alternately. When the low-switching current supply map shown in FIG. 9 is used, the control circuit 61 determines the current supply phase so that the following current supply states (C1) to (C6) are switched over sequentially in the predetermined angular rotation of the rotor 45.
(C1) No-current supply
(C2) One-phase current supply to U-phase coil 51
(C3) No-current supply
(C4) One-phase current supply to W-phase coil 53
(C5) No-current supply
(C6) One-phase current supply to V-phase coil 52

As described above, the low-switching current supply map may be set so that the one-phase current supply and the no-current supply are switched over alternately. The second embodiment provides the similar advantage as the first embodiment since the second switching number is set to be smaller than the first switching number.

Third Embodiment

Figure 10:
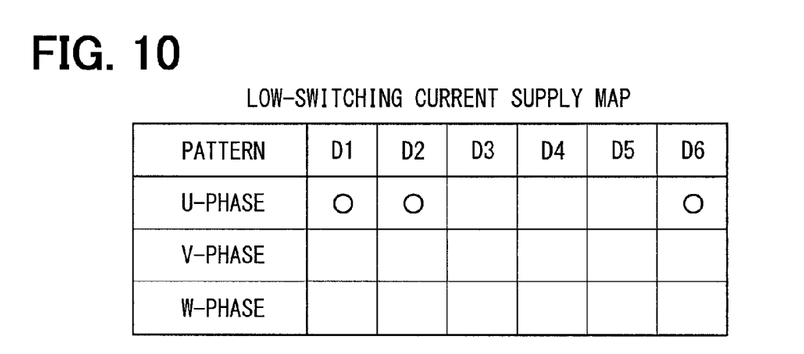
FIG. 10 is a table showing one power supply map, which is used by a motor control device according to a third embodiment.

In a third embodiment, the control circuit 61 of the motor control device determines the current supply phase by using a low-switching current supply map shown in FIG. 10. In the low-switching current supply map shown in FIG. 10, the no-current supply and the one-phase current supply are switched over. In the one-phase current supply, a current is supplied to only one phase coil 51 among the plural phase coils 51, 52 and 53. When the low-switching current supply map shown in FIG. 10 is used, the control circuit 61 determines the current supply phase so that the following current supply states (D1) to (D6) are switched over sequentially in the predetermined angular rotation of the rotor 45.
(D1) One-phase current supply to U-phase coil 51
(D2) One-phase current supply to U-phase coil 51
(D3) No-current supply state
(D4) No-current supply state
(D5) No-current supply state
(D6) One-phase current supply to U-phase coil 51

As described above, the low-switching current supply map may be set so that current is supplied to only one-phase coil 51 among the plural phase coils 51, 52 and 53. The second embodiment provides the similar advantage as the first embodiment since the second switching number is set to be smaller than the first switching number.

Fourth Embodiment

Figure 11:
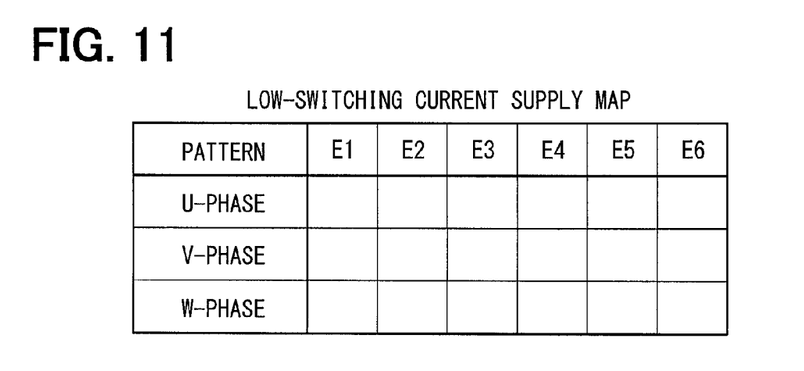
FIG. 11 is a table showing one power supply map, which is used by a motor control device according to a fourth embodiment.
Figure 12:
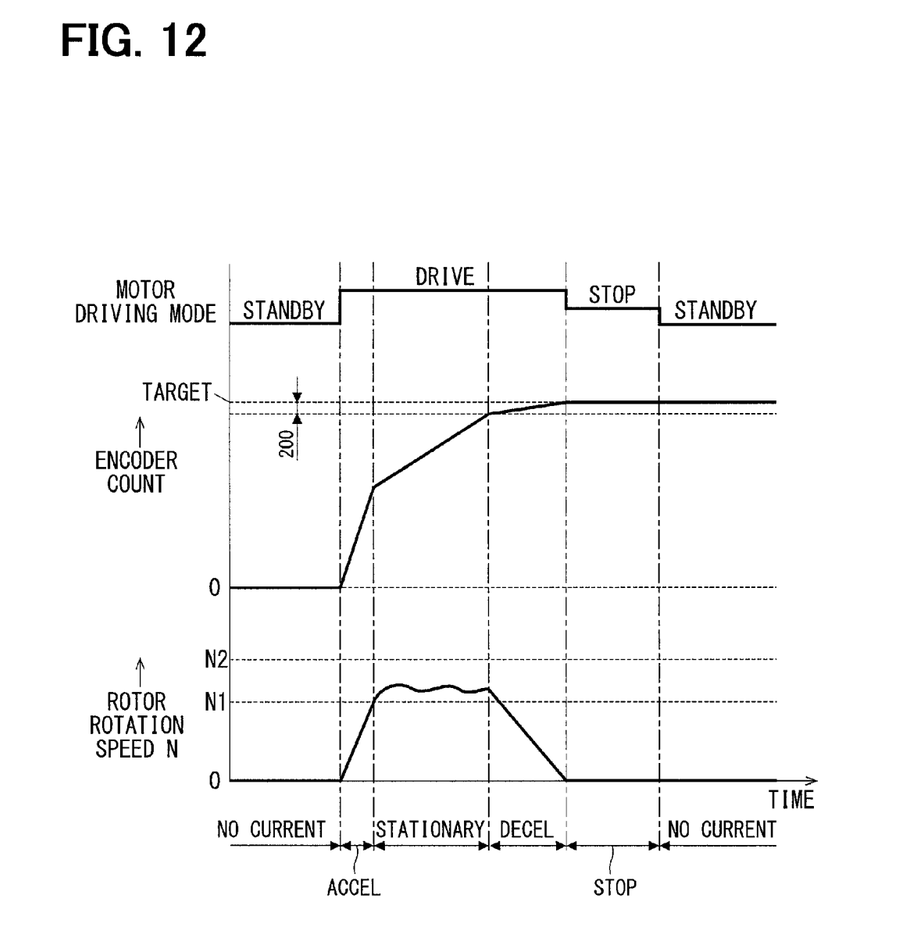
FIG. 12 is a time chart of one example of changes in a rotation speed of a rotor when the rotor of a motor is rotationally driven to a target rotation position in a shift-by-wire system, which implements the motor control device according to the fourth embodiment.

In a fourth embodiment, the control circuit 61 of the motor control device 33 determines the current supply phase by using a low-switching current supply map shown in FIG. 11. In the low-switching current supply map shown in FIG. 11, no-current supply is continued in all interval of the predetermined angular rotation of the rotor 45. When the low-switching current supply map shown in FIG. 11 is used, the control circuit 61 determines the current supply phase so that the following current supply states (E1) to (E6) are switched over sequentially in the predetermined angular rotation of the rotor 45.
(E1) No-current supply
(E2) No-current supply
(E3) No-current supply
(E4) No-current supply
(E5) No-current supply
(E6) No-current supply That is, in the fourth embodiment, the control circuit 61 sets the second switching number to 0. With this configuration, heat generation is lowered more in comparison to the first embodiment. In the fourth embodiment, no current is supplied to the motor 41 after the acceleration range. As a result, as shown in FIG. 12, the braking torque, which is generated by magnetic attraction force, is not applied to the rotor 45 in the normal rotation range. Although the rotation speed of the rotor 45 increases and decreases slightly at this time because of engagement of the engagement part 25 and the recess part of the detent plate 16, the rotor 45 can continue to rotate by inertia.

Other Embodiment

In the other embodiment of the present disclosure, the second switching number may be larger than one half of the first switching number. As far as the second switching number is smaller than the first switching number, heat generation can be suppressed. In the other embodiment, the third switching number, the fourth switching number and the fifth switching number may be different from the first switching number.

In the other embodiment, the motor may be other synchronous motors, which are other than switched reluctance motor. In the other embodiment, the encoder may be other than magnetic type. The encoder may output three or more signals. In the other embodiment, the motor control device may be implemented in any operation systems other than the shift-by-wire system of a vehicle. The present disclosure is not limited to the embodiments described above but may be implemented in different ways.

What is claimed is:

1. A motor control device for an operation system, which is provided with a motor, an encoder for outputting a pulse signal in synchronization with a rotation of a rotor of the motor, the motor control device comprising:
    a control circuit for determining a current supply phase of the motor based on the pulse signal outputted from the encoder; and
        a driving circuit for rotationally driving the rotor to a target rotation position by switching over the current supply phase in response to a command of the control circuit, wherein
        the control circuit is configured to switch over a current supply phase of the motor in a predetermined angular rotation of the rotor to cause the driving circuit to rotationally drive the rotor,
        the control circuit is configured to switch over the current supply phase of the motor in the predetermined angular rotation of the rotor a first switching number of times in an acceleration range using a normal current supply map, which is from a start of rotational driving of the rotor to attainment of a rotation speed of the rotor to a predetermined first threshold value, and in a deceleration range, which is from a start of decreasing the rotation speed of the rotor toward a stop at a target rotation position to the stop of the rotor at the target rotation position,
        the control circuit is configured to switch over the current supply phase of the motor in the predetermined angular rotation of the rotor a second switching number of times in a stationary rotation range between the acceleration range and the deceleration range using a low-switching current supply current supply map and in a specific condition that the rotation speed of the rotor is between the first threshold value and a predetermined second threshold value,
        the control circuit is configured to set the second switching number to be smaller than the first switching number, and
        the control circuit is configured to determine the current supply phase by selectively using current supply maps including the normal current supply map and the low-switching current supply map.

2. The motor control device according to claim 1, wherein:
    the control circuit is configured to set the second switching number to be equal to or smaller than one half of the first switching number.

3. The motor control device according to claim 2, wherein:
    the control circuit is configured to set the second switching number to 0.

4. The motor control device according to claim 3, wherein:
    the control circuit is configured to switch over a current supply mode between a one-phase current supply, in which a current is supplied to only one of plural phase coils of the motor, and a two-phase current supply, in which the current is supplied to any two of the plural phase coils of the motor, in the acceleration range; and
    the control circuit is configured to prohibit the current from being supplied to the motor in an entire period of the predetermined angular rotation of the rotor when the rotor is in the specific condition.

5. The motor control device according to claim 2, wherein:
    the control circuit is configured to switch over a current supply mode between a one-phase current supply, in which a current is supplied to only one of plural phase coils of the motor, and a two-phase current supply, in which the current is supplied to any two of the plural phase coils of the motor, in the acceleration range; and
    the control circuit is configured to switch over the current supply mode between the two-phase current supply and no-current supply when the rotor is in the specific condition.

6. The motor control device according to claim 2, wherein:
    the control circuit is configured to switch over a current supply mode between a one-phase current supply, in which a current is supplied to only one of plural phase coils of the motor, and a two-phase current supply, in which the current is supplied to any two of the plural phase coils of the motor, in the acceleration range; and
    the control circuit switches over the current supply mode between the one-phase current supply and no-current supply when the rotor is in the specific condition.

7. The motor control device according to claim 2, wherein:
    the control circuit is configured to control to supply a current to all of plural phase coils of the motor in the acceleration range; and
    the control circuit is configured to control current supply to a part of the plural phase coils when the rotor is in the specific condition.

8. The motor control device according to claim 2, wherein:
    the control circuit is configured to switch over the current supply phase of the motor in the predetermined angular rotation of the rotor a third switching number of times in the stationary rotation range and in a condition that the rotation speed of the rotor is higher than the second threshold value; and
    the control circuit is configured to set the third switching number to be larger than the second switching number.

9. The motor control device according to claim 8, wherein:
the control circuit is configured to switch over the current supply phase of the motor in the predetermined angular rotation of the rotor a third switching number of times in the stationary rotation range and in a condition that the rotation speed of the rotor is higher than the second threshold value; and
the control circuit is configured to set the third switching number to be larger than the second switching number.

10. The motor control device according to claim 1, wherein:
the control circuit is configured to set the second switching number to 0.

11. The motor control device according to claim 10, wherein:
the control circuit is configured to switch over a current supply mode between a one-phase current supply, in which a current is supplied to only one of plural phase coils of the motor, and a two-phase current supply, in which the current is supplied to any two of the plural phase coils of the motor, in the acceleration range; and
the control circuit is configured to prohibit the current from being supplied to the motor in an entire period of the predetermined angular rotation of the rotor when the rotor is in the specific condition.

12. The motor control device according to claim 1, wherein:
the control circuit is configured to switch over a current supply mode between a one-phase current supply, in which a current is supplied to only one of plural phase coils of the motor, and a two-phase current supply, in which the current is supplied to any two of the plural phase coils of the motor, in the acceleration range; and
the control circuit is configured to switch over the current supply mode between the two-phase current supply and no-current supply when the rotor is in the specific condition.

13. The motor control device according to claim 1, wherein:
the control circuit is configured to switch over a current supply mode between a one-phase current supply, in which a current is supplied to only one of plural phase coils of the motor, and a two-phase current supply, in which the current is supplied to any two of the plural phase coils of the motor, in the acceleration range; and
the control circuit switches over the current supply mode between the one-phase current supply and no-current supply when the rotor is in the specific condition.

14. The motor control device according to claim 1, wherein:
the control circuit is configured to control to supply a current to all of plural phase coils of the motor in the acceleration range; and
the control circuit is configured to control current supply to a part of the plural phase coils when the rotor is in the specific condition.

15. The motor control device according to claim 1, wherein:
the control circuit is configured to switch over the current supply phase of the motor in the predetermined angular rotation of the rotor a third switching number of times in the stationary rotation range and in a condition that the rotation speed of the rotor is higher than the second threshold value; and
the control circuit is configured to set the third switching number to be larger than the second switching number.

16. The motor control device according to claim 1, wherein:
the control circuit is configured to switch over the current supply phase of the motor in the predetermined angular rotation of the rotor a fourth switching number of times in the stationary rotation range and in a condition that the rotation speed of the rotor is lower than the first threshold value; and
the control circuit is configured to set the fourth switching number to be larger than the second switching number.

17. The motor control device according to claim 1, wherein:
the control circuit is configured to switch over the current supply state to either one of a one-phase current supply state, a two-phase current supply state, and no-current supply state, to cause the driving circuit to rotationally drive the rotor of the motor, wherein
in the one-phase current supply state, a current is supplied to either one of plural phase coils of the motor,
in the two-phase current supply state, currents are supplied to either two of the plural phase coils, and
in the no-current supply state, current supply is prohibited and no current is supplied to any one of the plural phase coils.

18. The motor control device according to claim 1, wherein:
the control circuit uses the normal current supply map to set the first switching number in the acceleration range and the deceleration range, and
the control circuit uses the low-switching current supply map to set the second switching number in the stationary rotation range.

19. A motor control device for an operation system for an automatic transmission of a vehicle, the operation system being provided with a motor, an encoder for outputting a pulse signal in synchronization with a rotation of a rotor of the motor, the motor control device comprising:
a control circuit for determining a current supply phase of the motor based on the pulse signal outputted from the encoder; and
a driving circuit for rotationally driving the rotor to a target rotation position by switching over the current supply phase in response to a command of the control circuit, wherein:
the control circuit is configured to switch over a current supply phase of the motor in a predetermined angular rotation of the rotor to cause the driving circuit to rotationally drive the rotor,
the control circuit is configured to switch over the current supply phase of the motor in the predetermined angular rotation of the rotor a first switching number of times in an acceleration range using a normal current supply map, which is from a start of rotational driving of the rotor to attainment of a rotation speed of the rotor to a predetermined first threshold value, and in a deceleration range, which is from a start of decreasing the rotation speed of the rotor toward a stop at a target rotation position to the stop of the rotor at the target rotation position,
the control circuit is configured to switch over the current supply phase of the motor in the predetermined angular rotation of the rotor a second switching number of times in a stationary rotation range between the acceleration range and the deceleration range using a low-switching current supply current supply map and in a specific condition that the rotation speed of the rotor is between the first threshold value and a predetermined second threshold value, the control circuit is configured to set the second switching number to be smaller than the first switching number, and the control circuit is configured to determine the current supply phase by selectively using current supply maps including the normal current supply map and the low-switching current supply map.

20. The motor control device according to claim 19, wherein:

the control circuit is configured to switch over the current supply state to either one of a one-phase current supply state, a two-phase current supply state, and no-current supply state, to cause the driving circuit to rotationally drive the rotor of the motor, wherein in the one-phase current supply state, a current is supplied to either one of plural phase coils of the motor, in the two-phase current supply state, currents are supplied to either two of the plural phase coils, and in the no-current supply state, current supply is prohibited and no current is supplied to any one of the plural phase coils.

* * * * *